United States Patent [19]

Russell

[11] Patent Number: 5,138,118
[45] Date of Patent: Aug. 11, 1992

[54] PULSED PEN FOR USE WITH A DIGITIZER TABLET

[75] Inventor: Gregory F. Russell, Yorktown Heights, N.Y.

[73] Assignee: International Business Machines Corporation, Armonk, N.Y.

[21] Appl. No.: 695,877

[22] Filed: May 6, 1991

[51] Int. Cl.$^5$ .............................. G08C 21/00
[52] U.S. Cl. ..................................... 178/19
[58] Field of Search ....................... 178/19, 18, 87

[56] References Cited

U.S. PATENT DOCUMENTS

| | | |
|---|---|---|
| 3,626,483 | 12/1971 | Whetstone et al. |
| 3,819,857 | 6/1974 | Inokuchi . |
| 3,875,331 | 4/1975 | Hasenbalg . |
| 3,886,311 | 5/1975 | Rodgers et al. |
| 4,227,044 | 10/1980 | Fencl . |
| 4,268,730 | 5/1981 | Higgins et al. |
| 4,368,351 | 1/1983 | Zimmer . |
| 4,532,376 | 7/1985 | Rockwell . |
| 4,542,261 | 9/1985 | Behnke . |
| 4,665,282 | 5/1987 | Sato et al. |
| 4,667,182 | 5/1987 | Murphy . |
| 4,672,154 | 6/1987 | Rodgers et al. |
| 4,695,680 | 9/1987 | Kable . |
| 4,786,765 | 11/1988 | Yamanami et al. |
| 4,868,351 | 9/1989 | Watanabe et al. |
| 4,883,926 | 11/1989 | Baldwin . |
| 4,902,858 | 2/1990 | Yamanami et al. |
| 4,975,546 | 12/1990 | Craig ............................ 178/19 |

FOREIGN PATENT DOCUMENTS

| | | |
|---|---|---|
| 52-12525 | 1/1977 | Japan . |
| 55-56230A | 4/1980 | Japan . |
| 58-86673 | 5/1983 | Japan . |
| 59-168583 | 9/1984 | Japan . |
| 2125564A | 8/1983 | United Kingdom . |

*Primary Examiner*—Stafford D. Schreyer
*Attorney, Agent, or Firm*—Perman & Green

[57] ABSTRACT

An inductive pen (16) repetitively transmits pulses of an oscillatory signal having a characteristic frequency. Pen state information, such as pen tip contact switch information, are encoded by a number of techniques. These techniques include pulse width modulation or pulse position modulation, so as to convey pen state information to a digitizing tablet in a manner that does not adversely affect pen position determinations. The pen state information may also be encoded on the oscillating signal by Frequency Shift Keying (FSK), Phase Shift Keying (PSK), or Amplitude Modulation (AM). A digitizer tablet (10) includes circuitry for detecting the transmitted pen state information, the circuitry accommodating the selected modulation scheme. The tablet is responsive to the transmitted pulses for placing tablet circuitry in a low-power consumption state between pulses so as to conserve tablet power.

27 Claims, 3 Drawing Sheets

FIG. IB  PWM
FIG. IC  PPM
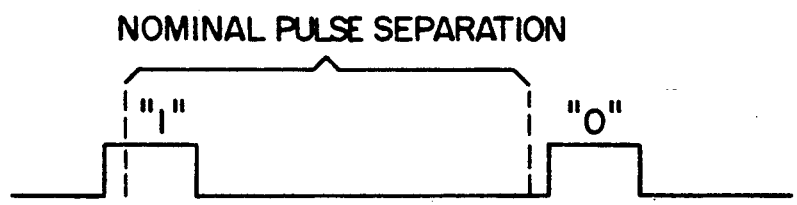
FIG. ID
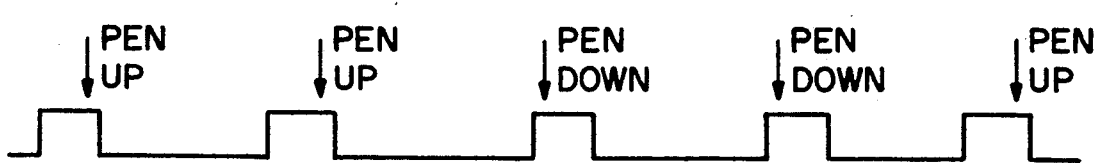

PULSED PEN FOR USE WITH A DIGITIZER TABLET

FIELD OF THE INVENTION

This invention relates generally to electromagnetic (EM) digitizing apparatus and methods and, in particular, to a pen used by an operator upon a writing surface of the tablet, the pen transmitting pulses of EM radiation.

BACKGROUND OF THE INVENTION:

A number of types of EM digitizers or digitizer tablets are known in the art. In general, a digitizer tablet provides an indication of a position of a probe with respect to a surface of a planar sensor grid One type of digitizer tablet operates by sensing a magnetic field and includes two sets of array conductors, with one set being orthogonally oriented to the other set. In this type of system the probe is driven with an AC signal to cause an oscillating magnetic field which induces signals in the array conductors. The signals in the array conductors are sensed and compared so as to determine the position of the probe in two dimensions, relative to the surface of the tablet.

Other types of digitizer tablets are also known, such as tablets that drive the array conductors and sense the field with the probe. Tablets that operate with electric fields and resistive bridges are also known. Tablets that include magnetostrictive elements are also well represented in the prior art.

The magnetic field sensing tablet is of particular interest herein. More specifically, this type of tablet measures a mutual inductance of a pair of coils. One of the pair of coils is located within the tablet and the other pair is located within the probe, also referred to herein as a pen. The pen may be physically coupled to the tablet through wiring, referred to as a "tethered" pen, or may be physically decoupled from the tablet as an "untethered" pen. The untethered pen embodiment is preferred in that a more natural user interface is provided. However, the use of the untethered pen significantly complicates the exchange of signals between the pen and the tablet, such as pen state information generated by a contact switch coupled to the tip of the pen.

A related problem concerns the encoding of the pen state information. In that the pen position is estimated from measurements of the RF field generated by the pen coil, the pen state information encoded on the RF field may potentially distort the position estimate. For example, if a significant change in the pen signal amplitude is used to indicate a pen-down state, the amplitude change may directly effect the signal measurements, requiring that a position estimate in progress be discarded whenever the pen-down state changes. Such discarding of data points significantly degrades the performance of the system near pen-up and pen-down events.

The following chronologically ordered U.S. patents are representative of a significant number of U.S. patents that have been issued in this technical area.

In U.S. Pat. No. 3,626,483, issued Dec. 7, 1971, entitled "Spark Pen" to Whetstone et al., there is disclosed a writing stylus that produces a fast rise time shock energy sound wave, generated by a spark, that is detectable by microphones.

In U.S. Pat. No. 4,368,351, issued Jan. 11, 1983, entitled "Amplitude Modulated Digitizer" to Zimmer, there is described a digitizer having a pointer driven by an alternating carrier signal A grid of sequentially enabled parallel spaced conductors is inductively coupled to the pointer and includes an AM demodulator for detecting an instantaneous time of change of phase of the signal induced in the grid.

In U.S. Pat. No. 4,672,154, issued Jun. 9, 1987, entitled "Low Power, High Resolution Digitizing System with Cordless Pen/Mouse" to Rodgers et al., there is described a cordless pen that emits a directional electrical field The pen tip is capacitvely coupled to embedded conductors in a digitizer tablet. The frequency of the pen signal is modulated by several pen switches. Circuitry in the digitizing tablet discriminates the pen frequency to decode commands represented by switch closures between data scanning operations.

In U.S. Pat. No. 4,786,765, issued Nov. 22, 1988, entitled "Coordinates Input System" to Yamanami et al., there is described a system having an antenna coil 13 within a tablet body 12. The tablet body is driven by a position detection circuit. When an input pen 2 approaches the tablet a magnetostrictive vibration is enhanced by means of a bar magnet. A 455 kHz pulse signal is supplied from a NAND gate to the antenna coil 13 and is transmitted as radio waves. A tuning circuit 22a within the pen resonates with the transmitted radio waves. The tuning circuit 22a continues to resonate with decreasing amplitude after the transmission is stopped and generates a signal C, as shown in FIG. 8. The signal C is transmitted as radio waves by a coil 222 and is received by the tablet antenna coil 13. As such, this system shows a pen that is stimulated by a pulsed transmission from the tablet to generate a gradually attenuated RF signal after the tablet transmission ceases.

In U.S. Pat. No. 4,902,858, issued Feb. 20, 1990, entitled "Coordinates Input Apparatus" to Yamanami et al., there is described a system said to be capable of differentiating between types of position designating devices and capable of detecting factors concerning the position designating devices, such as the position and status thereof. As in the immediately above mentioned U.S. patent there is provided a tablet body 12 and an antenna coil 13 for use with a pen 2. An oscillator 401 sequentially generates a plurality of groups of clock pulses each comprising a predetermined number of clock pulses having different frequencies. A pulse signal having frequencies of 450 KHz, 500 KHz and 550 KHz is applied to NAND gates to become a signal B. The signal B has pulses of different pulse duration, depending upon which frequency signal is being transmitted. The signal B is sent to the antenna coil 13 for transmission to the input pen 2. The input pen 2 resonates with radio waves having one of the transmitted frequencies. As in the previous patent, the tuning circuit 22 continues to resonate after the transmission from the tablet ceases and generates a gradually attenuated signal C that is transmitted as radio waves for reception by the antenna coil 13. The use of pulses of different frequency is to differentiate between different types of position designating devices.

Finally, in German Patent No. DT 2650127, issued May, 1978, entitled "Pen Type Transducer Converting Hand Written Data to Coded Signals—Uses HV Pulses Applied to Pen and Has Printed Circuit Matrix" there is described a pen 10 that carries a high voltage pulse. The pen includes a high resistance and is used to write information on a paper sheet. Arrays of X, Y bistable circuits detect the position of the pen.

What is not taught by this prior art, and what is thus an object of the invention to provide, is a transmitting pen or stylus that autonomously generates pulses of a frequency signal for reception by a digitizer tablet.

A further object of the invention is to provide an inductive pen having a pulsed transmission characteristic for accommodating a modulation scheme that does not adversely impact pen position measurements, and that reduces tablet power consumption and amplifier gain requirements while improving noise immunity.

SUMMARY OF THE INVENTION

The foregoing and other problems are overcome and the objects of the invention are realized by a pointing device, or pen, that transmits pulses of electromagnetic radiation having a characteristic frequency. Pen state information, such as pen tip contact switch information, may be encoded by a number of techniques, including pulse width modulation and pulse position modulation, so as to convey pen state information to a digitizing tablet in a manner that does not adversely affect pen position determinations. The pen state information may also be encoded on the pulsed frequency signal by Frequency Shift Keying (FSK), Phase Shift Keying (PSK), or Amplitude Modulation (AM). In a presently preferred embodiment each pulse of EM energy transmitted by the pen has a frequency of approximately 500 KHz.

A digitizer tablet constructed in accordance with the invention includes circuitry for detecting the transmitted pen state information, the circuitry accommodating the selected modulation scheme. The tablet also includes circuitry for placing tablet circuitry in a low-power consumption state between pen pulses so as to conserve tablet power, an important consideration in a battery operated digitizer tablet.

BRIEF DESCRIPTION OF THE DRAWING

The above set forth and other features of the invention are made more apparent in the ensuing detailed description of the invention when read in conjunction with the attached drawing, wherein:

FIG. 1b illustrates a pulse width modulation technique that is feature of the invention;

FIG. 1c illustrates a pulse position modulation technique that is a feature of the invention;

FIG. 1d illustrates the application of the pulse position modulation technique to the encoding of pen state information;

DETAILED DESCRIPTION OF THE INVENTION

Figure 1A:
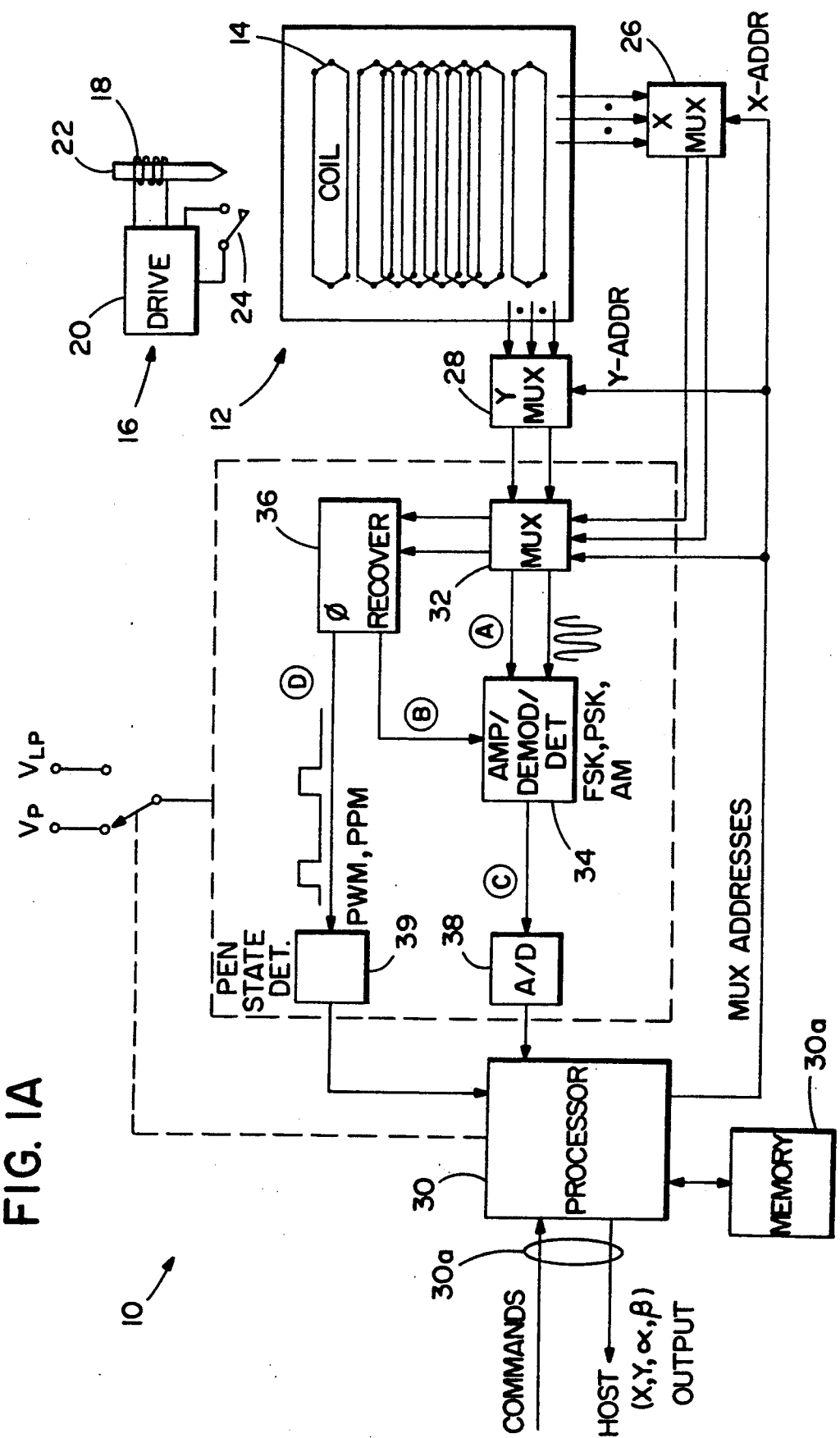
FIG. 1a is a block diagram of a digitizer tablet that is constructed and operated in accordance with the invention.

Referring to FIG. 1a there is shown in block diagram form a digitizer tablet 10. Tablet 10 includes a sensor grid 12 comprised of two superimposed coil arrays 14, the coils of one array 14 being orthogonally disposed relative to the coils of the other array. In FIG. 1a only one array 14 of coils is illustrated. During use, a pen 16 generates an electromagnetic signal that is sensed by the sensor grid 12.

Figure 2:
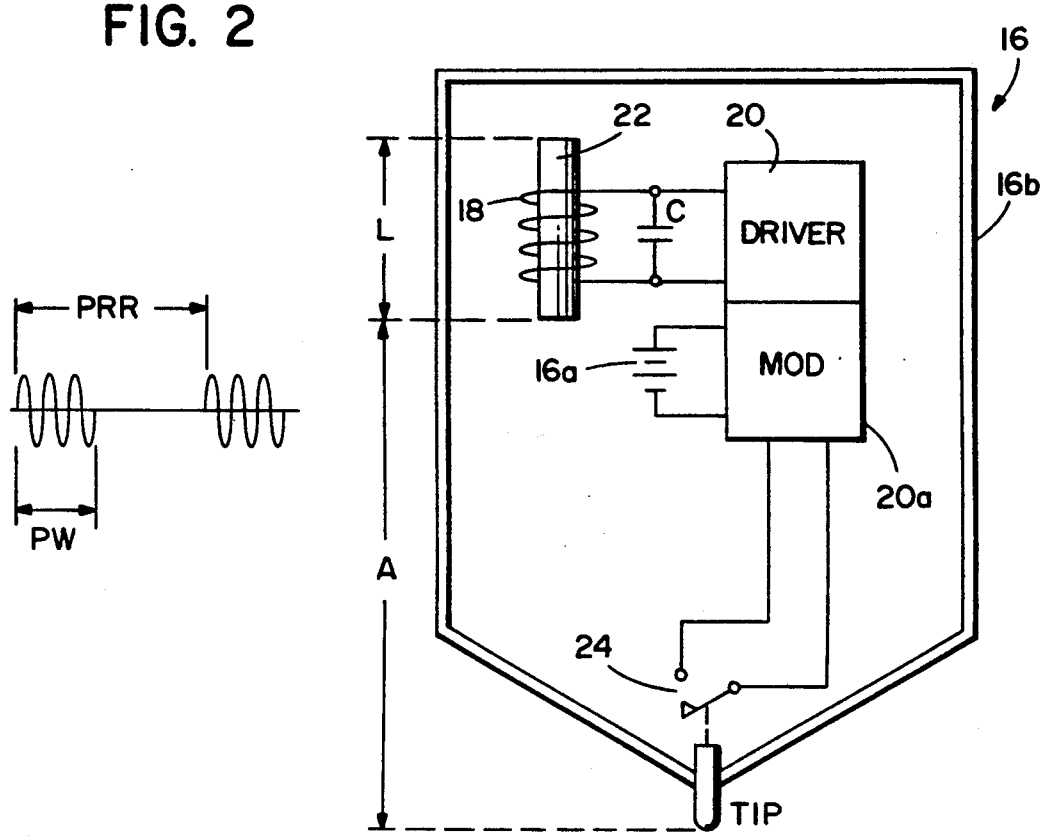
FIG. 2 is a simplified cross-sectional view showing in greater detail components of the digitizer tablet pen of the invention.

As can be more clearly seen in FIG. 2 the pen 16 includes an inductive coil 18, a capacitor (C) coupled across the coil for providing a resonant tank circuit, and a coil drive circuit 20. Coil 18 is wrapped around a ferrite core 22. A contact switch 24 is provided for indicating when the tip of the pen 16 contacts an upper surface of the sensor grid 12. The drive circuit 20 includes circuitry 20a, coupled between the switch 24 and the coil drive circuit 20, for encoding switch open/-closed information and for modulating the transmitted pulses in accordance with the modulation technique in use. The modulated pulses are received by the sensor grid 12. The circuitry 20a is preferably embodied as an integrated circuit, such as a preprogrammed microcontroller device, having an input coupled to the switch 24 and an output coupled to the drive circuit 20. The drive circuit 20 may be an integral part of the integrated circuit device. For the untethered pen embodiment a battery 16a is also provided for powering the various components within the pen 16.

For a tethered pen embodiment the pen state information may instead be transmitted by wiring to receivers in the tablet 10. Also, pen operating power may be provided from the tablet 10 to the pen 16 through wiring.

In accordance with an exemplary embodiment of the invention the inductance of each coil within the sensor grid 12 is approximately 0.1 to approximately 1.0 microhenries, for a coil that is one centimeter in width and approximately 20 centimeters in length. The inductance of the pen coil 18 is approximately 100 to approximately 200 microhenries. The coil 18 has a length (L) of approximately 11 millimeters, with the bottom of the pen coil 18 being disposed approximately six millimeters (dimension A) above the tip of the pen 16. The components of the pen 16 are contained within a body portion 16b, the entire assemblage being of a size that preferably corresponds to that of a conventional writing implement.

Tablet 10 (FIG. 1a) further includes an x-axis multiplexer 26 and a y-axis multiplexer 28 that receive inputs from coils of the x-axis sensor array 14a and the y-axis sensor array 14b, respectively. The coils may be directly coupled to the inputs of the multiplexers 26 and 28 or they may be coupled through impedance matching transformers. A particular coil is selected by means of a Y address signal (YADDR) and a second coil pair by means of an X address signal (XADDR), both of which are generated by a processor 30. The signal outputs from the selected y-axis coil and the selected x-axis coil are provided to a multiplexer 32. If the processor 30 is selecting one of the x-axis coil signals to be provided to an amplifier/demodulator/detector (ADD) block 34, a y-axis coil signal is selected and provided to a clock phase recovery circuit 36. Conversely, if the processor 30 is selecting one of the y-axis coil signals to be provided to the ADD block 34, an x-axis coil signal is selected and provided to the phase recovery circuit 36.

The phase recovery circuit 36 includes a phase-locked loop and generates a coherent detection clock (B) for use in decoding, by example, phase shift keying (PSK) or frequency shift keying (FSK) pen state modulation signals.

Figure 3A:
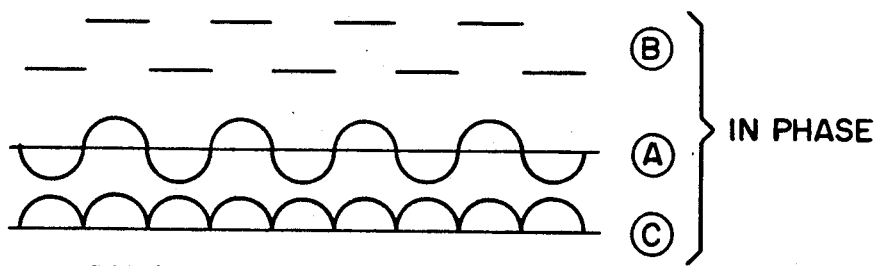
FIG. 3a shows signals that correspond to outputs of certain of the blocks of FIG. 1a, and specifically shows an in-phase relationship of a coherent detection clock with respect to a signal received from the sensor grid.
Figure 3B:
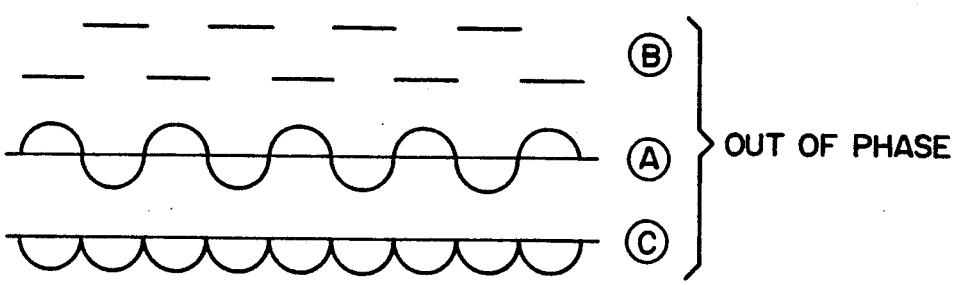
FIG. 3b illustrates signals corresponding to an out-of-phase relationship of the coherent detection clock with respect to the signal received from the sensor grid.

Referring to FIGS. 3a and 3b, the signal designated (A) in FIG. 1a is the input to the ADD 34 from the multiplexer 32. As was previously stated, this signal is a 500 KHz signal that may be PSK, FSK, or AM modulated by the pen 16 for conveying penstate information. Phase recovery circuit 36 generates a square wave signal which is the coherent detection clock (B). When the coherent detection clock is low, the corresponding portion of the A signal is inverted at the output of the ADD 34. When the coherent detection clock is in phase with the signal (A), the output signal (C) resembles a positive full-wave rectified signal as shown in FIG. 3a. When the coherent detection clock out of phase with the signal A, as shown in FIG. 3b, the output (C) resembles a negative full-wave rectified signal. The use of the coherent detection clock enables, for a differentially obtained coil signal, a determination if a coil signal is in phase (+) or out of phase (−) with other coil signal measurements.

The signal (C) is applied to an integrating analog-to-digital (A/D) converter 38 where the magnitude and sign of the signal is converted to a digital format for inputting to the processor 30.

More specifically, the coil signal strength is represented as a signed value proportional to the amplitude of the AC voltage induced in the coil grid 12 by the pen coil 18. The signal strength has a positive sign if the induced voltage is in phase with the pen coil 18 voltage, or a negative sign if the induced voltage is out of phase with the pen coil 18 voltage.

During use, the processor 30 sequentially scans a plurality of adjacent coils and measures the induced signal strengths in each coil. These measurements are operated upon by signal processing algorithms to arrive at an estimated pen position relative to the array of coils and, optionally, an estimated pen tilt.

A technique for accurately determining estimated pen position and pen tilt is disclosed in commonly assigned U.S. patent application Ser. No. 07/696,483, filed May 6, 1991, entitled "Pen Position and Tilt Estimators for a Digitizer Tablet", by Gregory Russell.

The processor 30 is connected to an external host by a communication line 30a, such as a conventional RS-232C serial communication line, and receives commands and set up information from the host. The processor 30 includes memory 30a for storing operating programs. During operation the processor 30 outputs packets of information relating to the position and, if required, angular orientation of the pen 16 relative to the sensor grid 12. This information includes x-axis and y-axis pen position information and tilt information (alpha and beta) regarding the orientation of the pen relative to a sensor grid 12 x-y coordinate system. During use, processor 30 may output several hundred pen position and orientation information packets per second.

In a presently preferred embodiment of the invention the pen driver 20 transmits repetitive pulses of EM radiation from the pen coil 18, the pulses preferably having a duty cycle of less than approximately 50 percent. Each pulse is comprised of an oscillatory signal having a frequency of approximately 500 KHz. The pulses are transmitted at a pulse repetition rate (PRR) of approximately 10 milliseconds with each pulse having a nominal pulse width (PW) of approximately one millisecond, resulting in a duty cycle of approximately ten percent. Each transmitted pulse has a power of approximately two milliwatts, resulting in an average power of approximately 200 microwatts.

For both the tethered pen and the untethered pen embodiments the pen 16 transmits the pulses autonomously. That is, the pen 16 transmits the pulsed frequency signal without being stimulated by an electromagnetic field generated by an external agent, such as a coil within the tablet as in the prior art. As a result, the transmitted signal amplitude may remain constant during the pulse and is not gradually attenuated during the transmission from pen to tablet. However, any desired pulse amplitude characteristic can be obtained through the use of the modulator 20a and the driver 20.

The use of the pulsed pen of the invention is also beneficial for an untethered, battery powered pen in that each pulse can be made to have a higher transmitted power than would be practical if the pen were operated in a CW mode. Operating with a higher transmitted power provides the benefit of reducing the required amplifier gains in the tablet 10 and improves the instantaneous signal to noise ratio.

The pen state information, such as pen switch open/closed information, may be encoded on the frequency signal by a number of suitable techniques. Presently preferred techniques include Frequency Shift Keying (FSK), Phase Shift Keying (PSK), or Amplitude Modulation (AM). The encoding and decoding of signals by FSK, PSK, and AM techniques are well known in the art and will not be specifically detailed herein.

Also, the pen state information may be encoded upon the envelope of the frequency signal using the techniques of Pulse Width Modulation (PWM) or Pulse Position Modulation (PPM).

FIG. 1b illustrates the encoding of a binary "1" and a binary "0" through the use of PWM. For PWM the pen 16 transmits the pulses of 500 KHz signal so as to have a pulse width that varies from a nominal pulse width. By example, a binary "1" is encoded by transmitting a pulse having a pulse width that is longer than the nominal pulse width, while a binary "0" is encoded by transmitting a pulse having a pulse width that is shorter than the nominal pulse width.

FIG. 1c illustrates the encoding of a binary "1" and a binary "0" through the use of PPM. For PPM the pen 16 transmits the pulses of 500 KHz signal so as to have a pulse separation that varies from a nominal pulse separation. By example, a binary "1" is encoded by transmitting a pulse that occurs earlier in time than the pulse would normally occur, while a binary "0" is encoded by transmitting a pulse that occurs later in time than would normally occur. The terms "earlier" and "later" are referenced to the nominal pulse repetition rate which, for the presently preferred embodiment of the invention, is approximately 10 milliseconds.

FIG. 1d illustrates the application of the PPM technique to the encoding of pen state information. Each arrow indicates a nominal pulse position. For a pen up state the pen 16 transmits the pulses such that the pulses occur earlier than the nominal position. For the pen down state the pulses are transmitted later in time. It should be noted that the specific modulation format shown in FIG. 1d is exemplary only.

Although PWM is one technique that experiences some loss of data during changes in pen state, this loss may be consistently confined to one sample interval per coil scan during which data is not measured. A threshold circuit monitors the demodulated signal from the coil grid 12, and a counter is enabled to count a reference frequency when the signal is above some predetermined threshold. A predetermined signal duration indicates the pen-down state.

For a differentially-sensed coil grid embodiment the signal magnitude cannot be readily used to detect the pulse width in that the measured signal magnitude is often near zero. Preferably, for a differentially-sensed coil grid a signal (D) is recovered from a coil that has a non-zero signal, and the pulse width, or pulse position for the case of PPM, is evident from the recovered non-zero signal. For the PPM embodiment, a pen state detector 39 synchronizes to the nominal pulse spacing and detects the shift in pulse position from the recovered signal (D). For the PWM embodiment, the pen state detector 39 synchronizes to the nominal pulse spacing and detects the change in pulse width from the recovered signal (D).

In an embodiment of the invention wherein coil measurements are performed with a coherent detector, the recovered coherent clock signal (B) is used to decode pen state information. For these cases, PSK or FSK may be used, provided the bandwidth is maintained at level that prevents distortions of the coil signals in any narrow-band filters that may be used in the detection system.

PSK or FSK modulation techniques have an advantage that the modulation scheme need not have any influence on the coil signal strength measurements. Thus, no data is required to be discarded due to the occurrence of pen state events.

Amplitude modulation of the pen generated oscillating signal within each pulse may be employed to encode the pen state information in a system having non-differentially sensed coils. This technique also potentially operates without distorting the position estimate data if the AM modulation frequency is selected to be a multiple of the coil scanning frequency. Stated differently, the AM modulation frequency is selected to be at a null of the frequency response curve of the pen position detection circuitry.

It is noted that the provision of pen state information is optional in the operation of the tablet 10. That is, the teaching of the invention is not to be construed to be limited to only a digitizer tablet that includes means for demodulating a signal to recover pen state or other encoded information therefrom.

The use of the pen 16 with a relatively low transmission duty cycle provides a significant advantage of enabling tablet circuitry, such as the analog signal detection circuits shown within the dashed block of FIG. 1a, to be switched into a low power mode between pulses. As shown, the processor 30 has an output coupled to a switch means for selecting a nominal operating potential ($V_p$) or a low power operating potential ($V_{lp}$). In operation, processor 30 synchronizes to pen pulses and determines the nominal pulse repetition rate and nominal pulse width. Thereafter, processor 30 switches the circuitry to $V_p$ before the expected occurrence of a pulse and switches to $V_{lp}$ after the pulse. This mode of operation is especially advantageous in a battery operated digitizer tablet.

Although described in the context of a digitizer tablet that senses magnetic fields the teaching of the invention also applies to digitizer tablets that sense electric fields.

Furthermore, other pen-state information may be encoded and transmitted, such as information generated by a pressure transducer coupled to the pen tip. Also, the various dimensions, frequencies, pulsewidths and the like disclosed above are not intended to limit the practice of the invention to only these specific values.

Thus, while the invention has been particularly shown and described with respect to presently preferred embodiments thereof, it will be understood by those skilled in the art that changes in form and details may be made therein without departing from the scope and spirit of the invention.

Having thus described my invention, what I claim as new, and desire to secure by Letters Patent is:

1. An inductive pen for use with a digitizer tablet of a type that includes a fixed array of inductors and means for determining a magnitude of a mutual inductance between the fixed array of inductors and the inductive pen for estimating a position of the inductive pen relative to a coordinate system associated with the fixed array of inductors, wherein the inductive pen includes means for autonomously transmitting pulses each of which includes an electromagnetic energy signal having a characteristic frequency.

2. An inductive pen as set forth in claim 1 wherein the characteristic frequency is approximately 500 KHz.

3. An inductive pen as set forth in claim 1 wherein the pulses have a duty cycle of less than approximately 50 percent.

4. An inductive pen as set forth in claim 1 wherein the inductive pen includes means for modulating the electromagnetic energy signal for conveying information and wherein the digitizer tablet includes means for decoding the information from the modulated electromagnetic energy signal.

5. An inductive pen as set forth in claim 1 wherein the electromagnetic energy signal is modulated for conveying information in accordance with a modulation technique selected from the group consisting of a pulse width modulation technique and a pulse position modulation technique.

6. An inductive pen as set forth in claim 1 wherein the electromagnetic energy signal is modulated for conveying information in accordance with a modulation technique selected from the group consisting of Frequency Shift Keying (FSK), Phase Shift Keying (PSK), and Amplitude Modulation (AM).

7. An inductive pen as set forth in claim 1 wherein the pulses are transmitted at approximately 10 millisecond intervals, and wherein each pulse has a nominal pulse width of approximately one millisecond.

8. An inductive pen as set forth in claim 1 wherein each pulse is transmitted with a power of approximately two milliwatts.

9. An inductive pen as set forth in claim 1 wherein the transmitting means includes an inductive coil having an inductance within a range of approximately 100 microhenries to approximately 200 michohenries.

10. An inductive pen as set forth in claim 9 wherein the inductive coil has a length of approximately 11 millimeters, and wherein a bottom of the inductive coil is disposed approximately six millimeters from a writing tip of the inductive pen.

11. An inductive pen as set forth in claim 4 and further including switch means for indicating a condition wherein a tip of the inductive pen is in contact with a writing surface of the digitizer tablet, and wherein an output of the switch means is coupled to an input of the modulating means such that the electromagnetic energy signal is modulated with information expressive of whether the pen tip is in contact with the writing surface.

12. A digitizer tablet, comprising:
an array of conductors defining a sensing plane for sensing a pulsed, oscillating, electromagnetic signal generated external to the sensing plane;
means, coupled to the array of conductors, for determining a magnitude of an electrical signal or signals induced within the array of conductors by the pulsed electromagnetic signal; and
means, coupled to an output of the determining means and responsive to the determined magnitude, for estimating a position of a source of the pulsed electromagnetic signal relative to a coordinate system associated with the sensing plane; wherein
the pulses of electromagnetic energy are modulated for conveying information, and wherein the determining means includes means for decoding the information conveyed by the pulses.

13. A digitizer tablet as set forth in claim 12 wherein the pulses of electromagnetic energy are modulated for conveying information in accordance with a modulation technique selected from the group consisting of a pulse width modulation technique and a pulse position modulation technique.

14. A digitizer tablet as set forth in claim 12 wherein the pulses of electromagnetic energy are modulated for conveying information in accordance with a modulation technique selected from the group consisting of Frequency Shift Keying (FSK), Phase Shift Keying (PSK), and Amplitude Modulation (AM).

15. A digitizer tablet as set forth in claim 12 wherein a frequency of the electromagnetic energy within each of the pulses is approximately 500 KHz.

16. A digitizer tablet as set forth in claim 12 and further comprising means, responsive to the occurrence of the pulses, for switching at least the determining means into a low-power state of operation during a period of time between pulses.

17. An inductive pen for use with a digitizer tablet, the inductive pen comprising:
an inductive coil; and
means for autonomously causing the inductive coil to repetitively transmit pulses of an oscillatory signal.

18. An inductive pen as set forth in claim 17 wherein the means for autonomously causing the inductive coil to repetitively transit pulses of an oscillatory signal includes means for modulating the oscillatory signal in accordance with pen-state information.

19. An inductive pen as set forth in claim 18 wherein the inductive pen further includes a tip contact switch, and wherein the information is expressive of a state of the switch.

20. An inductive pen as set forth in claim 17 wherein the oscillatory signal has a frequency of approximately 500 KHz.

21. An inductive pen as set forth in claim 17 wherein the pulses have a duty cycle of less than 50%.

22. An inductive pen as set forth in claim 18 wherein the oscillatory signal is modulated for conveying pen-state information in accordance with a modulation technique selected from the group consisting of a pulse width modulation technique and a pulse position modulation technique.

23. An inductive pen as set forth in claim 18 wherein the oscillatory signal is modulated for conveying pen-state information in accordance with a modulation technique selected from the group consisting of Frequency Shift Keying (FSK), Phase Shift Keying (PSK), and Amplitude Modulation (AM).

24. An inductive pen as set forth in claim 17 wherein individual pulses are transmitted at approximately 10 millisecond intervals, and wherein each of the pulses has a nominal pulse width of approximately one millisecond.

25. An inductive pen as set forth in claim 17 wherein each of the pulses is transmitted with a power of approximately two milliwatts.

26. An inductive pen as set forth in claim 17 wherein the driving means has an output coupled to an inductive coil having an inductance within a range of approximately 100 microhenries to approximately 200 microhenries.

27. An inductive pen as set forth in claim 26 wherein the inductive coil has a length of approximately 11 millimeters, and wherein a bottom of the inductive coil is disposed approximately six millimeters from a writing tip of the inductive pen.

* * * * *